(12) United States Patent
Shyu et al.

(10) Patent No.: US 10,014,640 B2
(45) Date of Patent: Jul. 3, 2018

(54) ALTERNATING CURRENT ADAPTER

(71) Applicant: HEWLETT-PACKARD DEVELOPMENT COMPANY, L.P., Houston, TX (US)

(72) Inventors: Vincent Kenya Shyu, Spring, TX (US); Chad Patrick Paris, Houston, TX (US); Ilchan Lee, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/501,213

(22) PCT Filed: Sep. 30, 2014

(86) PCT No.: PCT/US2014/058414
§ 371 (c)(1),
(2) Date: Feb. 2, 2017

(87) PCT Pub. No.: WO2016/053317
PCT Pub. Date: Apr. 7, 2016

(65) Prior Publication Data
US 2017/0222383 A1  Aug. 3, 2017

(51) Int. Cl.
*H01R 13/72* (2006.01)
*H01R 31/06* (2006.01)
(Continued)

(52) U.S. Cl.
CPC ............ *H01R 31/065* (2013.01); *G06F 1/26* (2013.01); *H01R 13/72* (2013.01); *H01R 24/20* (2013.01);
(Continued)

(58) Field of Classification Search
CPC .. H01R 13/065; H01R 13/72; H01R 13/5804; H01R 13/5812; H01R 13/506;
(Continued)

(56) References Cited

U.S. PATENT DOCUMENTS 4,910,362 A * 3/1990 Kinner .................... D06F 75/28
174/135
4,921,444 A * 5/1990 Cama ..................... H01R 13/60
439/528

(Continued)

FOREIGN PATENT DOCUMENTS

DE    102010035711 A1    3/2012
JP    H11-284368 A    10/1999
(Continued)

OTHER PUBLICATIONS

"Kodak Power Supply—Easyshare 5100 Printer All in One AIO—AC Cable Plug Unit," Apr. 28, 2011, pp. 1-4, iOffer.

*Primary Examiner* — Michael A Lyons
*Assistant Examiner* — Milagros Jeancharles
(74) *Attorney, Agent, or Firm* — HPI Patent Department (57) ABSTRACT

Examples disclosed herein relate to an alternating current (AC) adapter. In one example, an AC adapter includes an adapter head with an arm extending from a first side of a surface of the adapter head towards a centerline of the first surface of the adapter head to secure a cable to the first surface of the adapter head. A housing body is coupled to the adapter head. The arm is deformable to be biased towards a first position to secure the cable between the arm and the first surface of the adapter head and flexed to a second position to allow an operator to insert the cable between the arm and the first surface of the adapter head.

15 Claims, 7 Drawing Sheets

(51) Int. Cl.
*H01R 24/20* (2011.01)
*H01R 24/38* (2011.01)
*H02J 7/02* (2016.01)
*G06F 1/26* (2006.01)
*H01R 103/00* (2006.01)
*H01R 107/00* (2006.01)

(52) U.S. Cl.
CPC .............. *H01R 24/38* (2013.01); *H02J 7/02* (2013.01); *H01R 2103/00* (2013.01); *H01R 2107/00* (2013.01)

(58) Field of Classification Search
CPC ............ H01R 13/5808; H01R 13/5829; H01R 13/5825; H01R 13/5837; H01R 13/6271; H01R 13/6272; H01R 13/6273; H01R 13/60; H01R 24/20; H01R 24/38; G06F 1/26; H02G 11/02
USPC ................. 439/501, 470, 471, 638, 719, 4
See application file for complete search history.

(56) References Cited

U.S. PATENT DOCUMENTS

| | | | | |
|---|---|---|---|---|
| 5,138,351 A * | 8/1992 | Wiegand | .............. | G03B 7/26 320/111 |
| 5,352,854 A * | 10/1994 | Comerci | ............ | H02G 3/0633 174/175 |
| 5,483,437 A * | 1/1996 | Tang | .................. | G06F 1/1616 320/111 |
| 6,341,881 B1 * | 1/2002 | Huang | ............... | F21V 19/0005 362/249.01 |
| 6,359,764 B1 | 3/2002 | Chou | | |
| 6,428,348 B1 * | 8/2002 | Bean | ................. | B65H 75/4473 439/501 |
| 6,780,027 B2 | 8/2004 | Allison | | |
| 7,081,006 B2 * | 7/2006 | Lichtscheidl | ........ | H01R 25/003 439/131 |
| 7,467,971 B2 * | 12/2008 | Lin | ....................... | H01R 13/60 191/12.2 R |
| 7,563,130 B2 * | 7/2009 | Farrar | ................... | B65H 75/06 320/111 |
| 7,585,182 B2 * | 9/2009 | Asante | ................ | H01R 13/562 439/502 |
| 7,641,500 B2 | 1/2010 | Stoner et al. | | |
| 7,803,012 B2 * | 9/2010 | Shen | .................... | H01R 13/652 439/501 |
| 7,815,025 B2 * | 10/2010 | Chen | .................. | B65H 75/4431 191/12 R |
| 8,529,287 B2 * | 9/2013 | Frenkil | ................. | B65H 75/06 439/501 |
| 8,802,991 B1 * | 8/2014 | Hua | ..................... | H01R 31/065 174/133 R |
| 2002/0168891 A1 * | 11/2002 | Kitou | ....................... | F21S 9/04 439/501 |
| 2005/0014413 A1 | 1/2005 | Kurokawa | | |
| 2005/0090142 A1 * | 4/2005 | Yang | ..................... | H01R 13/72 439/501 |
| 2008/0053685 A1 * | 3/2008 | Chen | ................... | B65H 75/4431 174/135 |
| 2009/0035986 A1 * | 2/2009 | Tracy | ..................... | H01R 13/72 439/501 |
| 2010/0139950 A1 * | 6/2010 | Chen | .................... | H01R 13/72 174/135 |
| 2011/0068043 A1 | 3/2011 | Kano | | |
| 2012/0322296 A1 * | 12/2012 | Frenkil | ................. | H01R 13/72 439/501 |
| 2013/0137285 A1 | 5/2013 | Miura et al. | | |

FOREIGN PATENT DOCUMENTS

| | | | |
|---|---|---|---|
| JP | 2004-327139 A | 11/2004 | |
| WO | WO 2012173888 A2 * | 12/2012 | ............. B65H 75/06 |

* cited by examiner

ALTERNATING CURRENT ADAPTER

BACKGROUND

Many electronic devices require direct current of a specific voltage and current to operate. Alternating current (AC) adapters are used to convert received alternating current into direct current of the specific voltage and current of the device. AC adapters may be separate from the electronic device and attached to the power cord of the electronic device.

BRIEF DESCRIPTION OF THE DRAWINGS

The following detailed description references the drawings, wherein.

DETAILED DESCRIPTION

In the following discussion and in the claims, the terms "including" and "comprising" are used in an open-ended fashion, and thus should be interpreted to mean "including, but not limited to . . . ." Also, the term "couple" or "couples" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, (3) through an optical electrical connection, (4) through a wireless electrical connection, and/or (5) another suitable coupling. The term "approximately" as used herein to modify a value is intended to be determined based on the understanding of one of ordinary skill in the art, and can, for example, mean plus or minus 10% of that value.

The following discussion is directed to various examples of the disclosure. The examples disclosed should not be interpreted, or otherwise used, as limiting the scope of the disclosure, including the claims. In addition, the following description has broad application, and the discussion of any example is meant to be descriptive of that example, and not intended to intimate that the scope of the disclosure, including the claims, is limited to that example.

As the number of electronic devices that are plugged into a wall power socket increases, the need to manage cables associated with the electronic devices has increased. Many electronic devices use an alternating current (AC) adapter to convert received AC into direct current (DC) of a specified voltage and current to be used by the device. AC adapters generally have cords extending therefrom that connect to the electronic device and the wall socket. Many different methods of managing the cable of an AC adapter have emerged including wrapping the cable around the AC adapter housing, tying the cable with a tie (e.g., a twist tie, a Velcro® tie, etc.), winding the cable around arms emerging from the AC adapter housing, etc. However, such cable management methods may stress the cable at a joint with the AC adapter housing which may cause the cable to break. Furthermore, some cable management methods may expose the cable to heat being dissipated by the AC adapter housing which may damage the cable.

To address these issues, in the examples described herein, an AC adapter may include an arm extending from the AC adapter to elastically engage the cable against the AC adapter. In this manner, examples described herein may reduce stress on cables from winding or tying the cable and may reduce the amount of dissipating heat the cable is exposed too. The arm of the AC adapter may also support the AC adapter to an elevated position forming an angle with a surface on which it is disposed. In this manner, examples described herein may allow for increased air cooling of the AC adapter thereby reducing the amount of dissipating heat the cable is exposed to.

Figure 1:
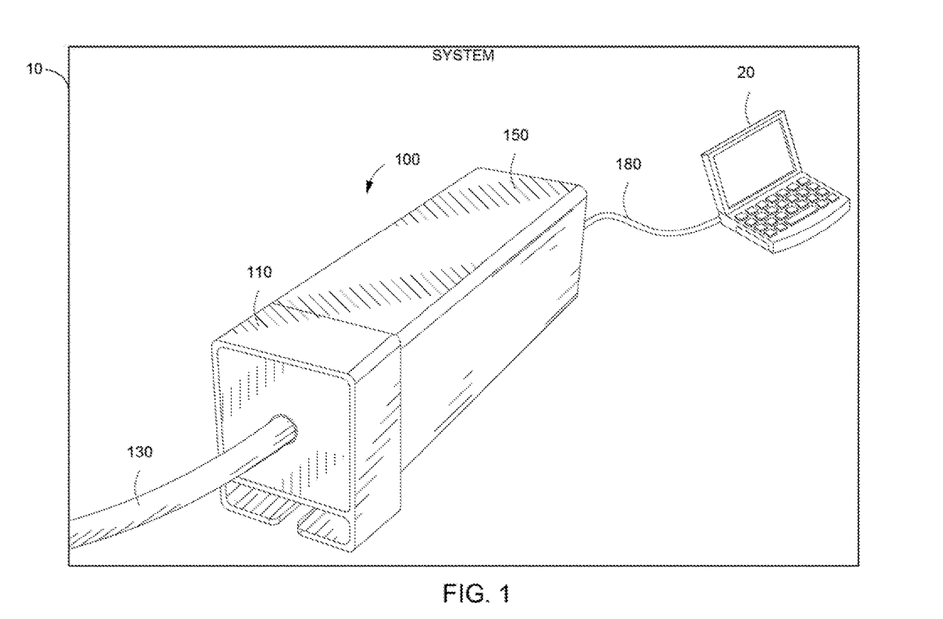
FIG. 1 is a diagram of a computing system including a schematic front perspective view of an alternating current adapter, according to an example.
Figure 2:
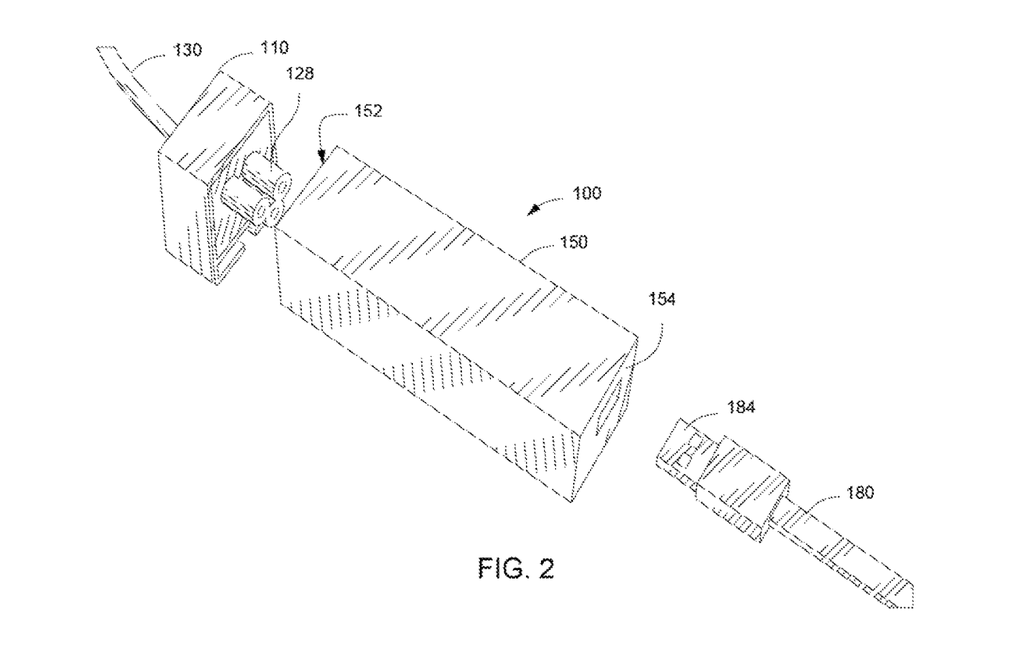
FIG. 2 is a schematic exploded view of the alternating current adapter of FIG. 1 according to an example.
Figure 3:
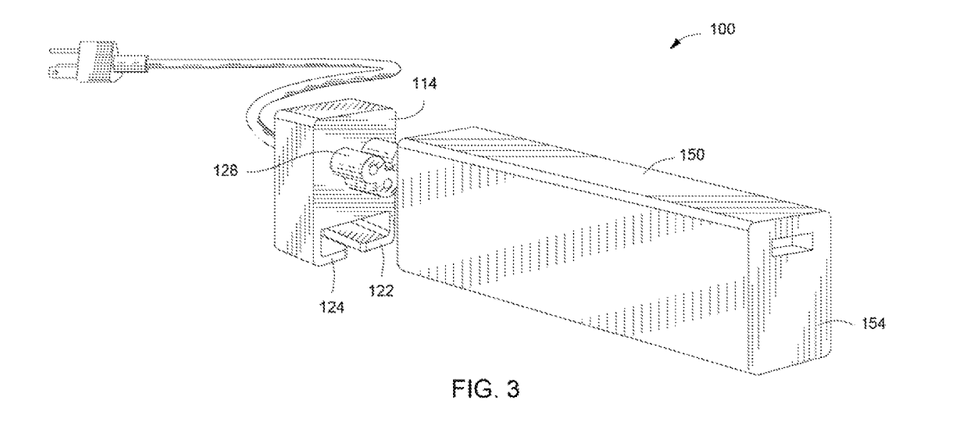
FIG. 3 is a rear schematic partial exploded view of the alternating current adapter of FIG. 1 according to an example.

Referring now to the drawings, FIG. 1 illustrates diagram of a computing system 10 including a schematic front perspective view of an AC adapter 100. FIG. 2 is a schematic exploded view of AC adapter 100 of FIG. 1. FIG. 3 is a rear schematic partial exploded view of AC adapter 100 of FIG. 1. Computing system 10 includes a computing device 20 coupled to AC adapter 100. A "computing device" or "device" may be a desktop computer, laptop (or notebook) computer, all-in-one computer, workstation, tablet computer, mobile phone, smart device, server, blade enclosure, imaging device, or any other electronic device or equipment which use an adapter to operate or recharge. Referring to FIGS. 1-3. AC adapter 100 includes a first cable 130, an adapter head 110, a housing body 150, and a second cable 180. First cable 130 extends from adapter head 110. Adapter head 110 is coupled to a first surface 152 (not visible) of housing body 150 and second cable 180 is coupled to a second surface 154 of housing body 150.

Adapter head 110 is coupled to first surface 152 of housing body 150 via a plug 128 extending from a second surface 114 of adapter head 110 to enable an electrical connection between the first cable 130 and the housing body 150. In an example, plug 128 is a three-prong plug, however, the examples are not limited thereto and plug 128 may be of any shape. Second cable 180 is coupled to second surface 154 of housing body 150 via a universal serial bus (USB) connector 184 to enable an electrical connection between second cable 180 and housing body 150. However, the examples are not limited thereto and first cable 130 and second cable 180 may be coupled to housing body 150 via any electrical connection. In some implementations, housing body 150 includes all electrical circuitry necessary to convert alternating current into direct current. For example, housing body 150 may include a transformer to convert the received alternating current to a lower voltage, a rectifier to convert alternating current to pulsating direct current, and a filter to smooth the pulsating waveform to direct current. In another example, housing body 150 may include switched-mode power supplies (SMPSs) in which input alternating current is rectified to a high direct voltage and converted to direct current by a transformer at a certain output voltage. In some implementations, housing body 150 may include all electrical circuitry necessary to convert direct current into alternating current.

In some implementations, second cable 180 may provide output direct current from housing body 150 to computing device 20 coupled to a connector (not shown) of second cable 180. In another example, received direct current may be converted and output alternating current may be provided to computing device 20. Additionally or in the alternative, second cable 180 can be used to allow data communication between computing device 20 and another device via second cable 180. Data communication can, for example, be in the form of analog signals (e.g., certain VGA connectors) or digital signals (e.g., certain HDMI connectors). In some implementations, a single plug (such as a Micro-USB plug) can be used to both charge the electronic device and allow data communication with the electronic device.

Figure 4:
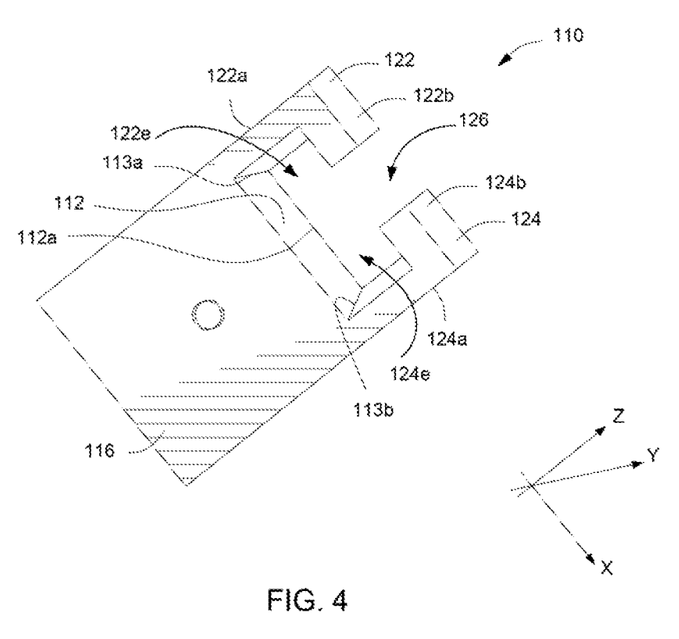
FIG. 4 is a schematic bottom perspective view of an adapter head of the alternating current adapter of FIG. 1 according to an example.
Figure 5:
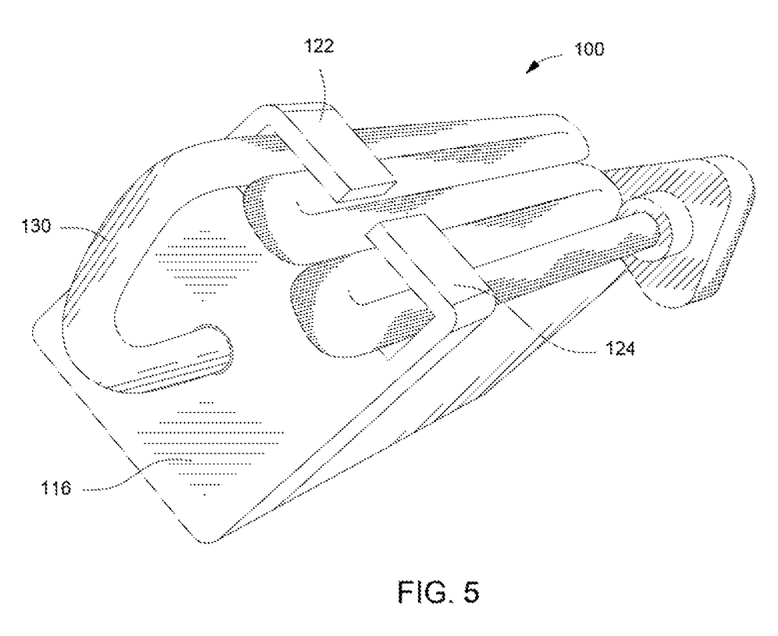
FIG. 5 is a schematic bottom view of the alternating current adapter of FIG. 1 in a according to an example.

FIG. 4 illustrates a schematic bottom perspective view of adapter head 110 of AC adapter 100 of FIG. 1. FIG. 5 illustrates a schematic bottom view of AC adapter 100 of FIG. 1. Referring to FIGS. 4-5, a first arm 122 extends from a first side 113a of a first surface 112 of adapter head 110 and a second arm 124 extends from a second side 113b of first surface 112 opposite first side 113a. In some implementations, first arm 122 and second arm 124 may be made of any material to enable first arm 122 and second arm 124 to elastically engage first cable 130 and/or second cable 180 (not shown in FIGS. 4-5) in a gap 122e and a gap 124e, respectively. In an example, first arm 122 and second arm 124 may compress first cable 130 and/or second arm 180 against first surface 112. In such an example, first arm 122 and second arm 124 may be elastically deformable to be biased towards a first position to engage first cable 130 and/or second cable 180 between first arm 122 and/or second arm 124 and first surface 112 of adapter head 110 and flexed to a second position to allow an operator to insert first cable 130 and/or second cable 180 between first arm 122 and/or second arm 124 and first surface 112 of adapter head 110. In another example, first arm 122 and second arm 124 may not be elastically deformable to the first position or the second position, but rather, gap 122e and gap 124e may be dimensioned to allow first cable 130 or second cable 180 to be secured therein. For example, first cable 130 and/or second cable 180 may be elastically deformable to engage first arm 122 and first surface 112 such that first cable 130 and/or second cable 180 may be removed by an operator. In such an example, first cable 130 may be compressed into gap 122e via a gap 126 between first arm 122 and second arm 124 to engage first arm 122 and first surface 112. Similarly, in an example, first cable 130 and/or second cable 180 may be elastically deformable to engage between second arm 124 and first surface 112 such that first cable 130 and/or second cable 180 may be removed by an operator. In such an example, second cable 180 may be compressed into gap 124e via gap 126 to engage second arm 124 and first surface 112.

As illustrated in FIG. 5, first arm 122 and second arm 124 may engage first cable 130 extending from a third surface 116 of adapter head 110 at more than one location such that first cable 130 may be arranged in an accordion fold or any other fold against a face of AC adapter 100. In such a configuration, first cable 130 may be exposed to heat being dissipated by the face of AC adapter 100 against which first cable 130 may be secured. In such an example, first cable 130 may be exposed to less dissipating heat from AC adapter 100 when secured against a face of AC adapter 100, as shown in FIG. 5, than when first cable 130 is wound around housing body 150. In some implementations, first arm 122 and second arm 124 may engage second cable 180 against a face of AC adapter 100 as described above. In other implementations, second cable 180 may be secured by one of first arm 122 and second arm 124 when first cable 130 may be secured by the other arm.

Referring back to FIG. 4, in some implementations, adapter head 110 may be a single piece formed or extruded of the same material. For example, adapter head 110, including first arm 122 and second arm 124, may be a polyester-based thermoplastic polyurethane (TPU), polyether-based TPU, a thermoplastic elastomers (TPE) rubber, Polycarbonate/Acrylonitrile Butadiene Styrene (PC/ABS), etc. In another example, first arm 122 and second arm 124 may be composed of a different material from adapter head 110 or may be a separate piece from adapter head 110 and coupled to adapter head 110 by any suitable mechanism or fastening.

First arm 122 extends from first side 113a towards a centerline 112a of first surface 112. First arm 122 includes a first surface 122a extending upwards from first side 113a and a second surface 122b extending from first surface 122a approximately parallel to first surface 112. In an example, first surface 122a may extend upward from first surface 112 along a z-axis a distance equal to or greater than a width of first cable 130 and/or a width of second cable 180. In an example, a length of first surface 122a may be the same length as adapter head 110 along a y-axis. In another example, first surface 122a may be smaller than a length of adapter head 110 along the y-axis.

Second arm 124 extends from second side 113b towards centerline 112a of first surface 112. Second arm 124 includes a first surface 124a extending upwards from second side 113b and a second surface 124b extending from first surface 124a approximately parallel to first surface 112. In an example, first surface 124a may extend upward from first surface 112 along a z-axis a distance equal to or greater than a width of first cable 130 and/or a width of second cable 180. In an example, first surface 124a may be the same length as adapter head 110 along a y-axis. In another example, first surface 124a may be smaller than a length of adapter head 110 along the y-axis. In an example, second arm 124 may be aligned with first arm 122 to form gap 126 between first arm 122 and second arm 124.

In an example, gap 126 between first arm 122 and second arm 124 is of sufficient width to allow first cable 130 or second cable 180 to pass through gap 126. For example, gap 126 may have a distance greater than a width of first cable 130 and/or second cable 180. In another example, gap 126 between first arm 122 and second arm 124 may be smaller than the width of first cable 130 and/or second cable 180 such that first cable 130 and/or second cable 180 may be elastically deformable to be compressed into gap 126. Although first arm 122 and second arm 124 are shown in FIGS. 4-5 as having a straight edge to form gap 126, the examples are not limited thereto, and the edge of first arm 122 and second arm 124 which form gap 126 may be rounded or angled.

In an example, second arm 124 may be formed to mirror first arm 122. In such an example, first arm 122 and second arm 124 may be the same length as adapter head 110 along the y-axis. However, the examples are not limited thereto and second arm 124 may not mirror first arm 122. In an example, first arm 122 and second arm 124 may be offset from each other along a y-axis. In such an example, first arm 122 and second arm 124 may not be the same length as adapter head 110 along the y-axis. In another example, second surface 124b of second arm 124 may not extend along the x-axis the same distance as second surface 122b of first arm 122.

Figure 6:
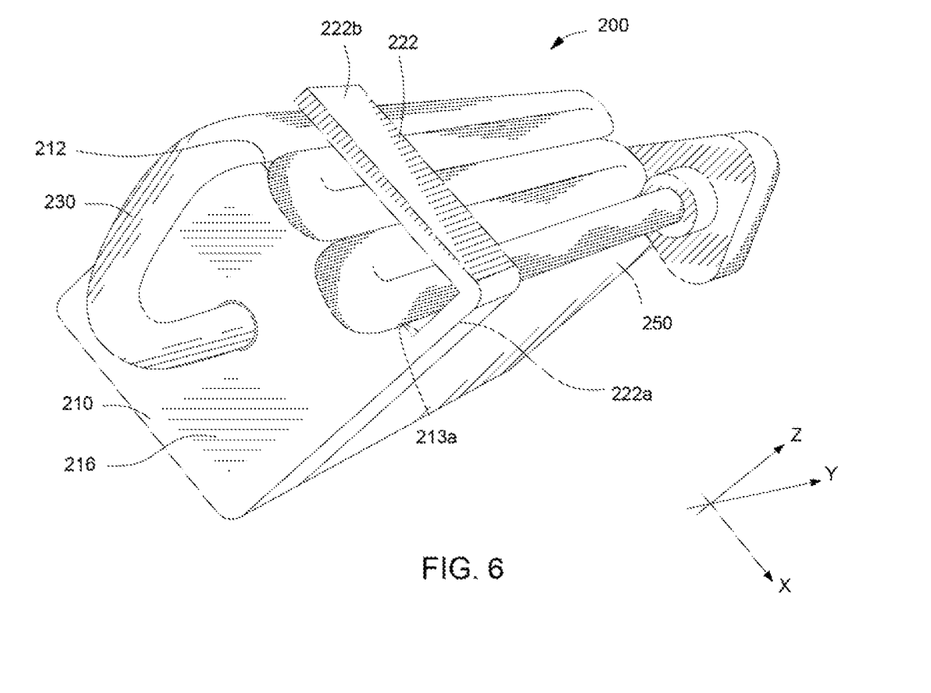
FIG. 6 illustrates a schematic bottom view of an alternating current adapter according to an example.

FIG. 6 illustrates a schematic bottom view of an AC adapter 200. AC adapter 200 includes a first cable 230, an adapter head 210, a housing body 250, and a second cable 280 (not shown). AC adapter 200 may include many of the features of AC adapter 100. First cable 230 extends from a surface 216 of adapter head 210. Adapter head 210 is coupled to housing body 250. Adapter head 210 may be coupled to housing body 250 via a plug to enable an electrical connection between first cable 230 and housing body 250, as described above with respect to FIGS. 1-5 and 7. Similarly, second cable 280 is coupled to housing body 250 via a plug to enable an electrical connection as described above with respect to FIGS. 1-5 and 7. In some implementations, housing body 250 may include all electrical circuitry necessary to convert alternating current into direct current. For example, housing body 250 may include a transformer to convert the received alternating current to a lower voltage, a rectifier to convert alternating current to pulsating direct current, and a filter to smooth the pulsating waveform to direct current. In another example, housing body 250 may include switched-mode power supplies (SMPSs) in which input alternating current is rectified to a high direct voltage and converted to direct current by a transformer at a certain output voltage. In some implementations, housing body 250 may include all electrical circuitry necessary to convert direct current into alternating current.

An arm 222 extends from a first side 213a of a first surface 212 (not fully shown) of adapter head 210 towards a second side of first surface 212 opposite first side 213a. In some implementations, arm 222 may be made of any material to enable arm 222 to elastically engage first cable 230 and/or second cable 280 in a gap between arm 222 and first surface 212. In an example, arm 222 may compress first cable 230 and/or second arm 280 against first surface 212. In such an example, arm 222 may be elastically deformable to be biased towards a first position to engage first cable 230 and/or second cable 280 between arm 222 and first surface 212 of adapter head 110 and flexed to a second position to allow an operator to insert first cable 230 and/or second cable 280 between arm 222 and the first surface 212 of adapter head 210. In another example, arm 222 may not be elastically deformable to the first position or the second position, but rather, the gap between arm 222 and first surface 212 be dimensioned to allow first cable 230 or second cable 280 to be secured therein. For example, first cable 230 and/or second cable 280 may be elastically deformable to engage arm 222 and first surface 212 such that first cable 230 and/or second cable 280 may be removed by an operator. In such an example, first cable 230 may be compressed into the gap between arm 222 and first surface 212 to engage arm 222 and first surface 212.

In an example, adapter head 210 may be a single piece formed or extruded of the same material. For example, adapter head 210, including arm 222, may be a polyester-based thermoplastic polyurethane (TPU), polyether-based TPU, a thermoplastic elastomers (TPE) rubber, polycarbonate/acrylonitrile butadiene styrene (PC/ABS), etc. In another example, arm 222 may be composed of a different material from adapter head 210 or may be a separate piece from adapter head 210 and coupled to adapter head 210 by any suitable mechanism or fastening.

As shown in FIG. 6, arm 222 includes a first surface 222a extending upwards from first side 213a and a second surface 222b extending from first surface 222a approximately parallel to first surface 212. In an example, first surface 222a may extend upward from first surface 212 along a z-axis a distance equal to or greater than a width of first cable 230 and/or a width of second cable 180. In an example, second surface 222b may be the same length as adapter head 210 along an x-axis. In another example, second surface 222b may be smaller than a length of adapter head 210 along an x-axis. In an example, a length of first surface 222a may be the same length as adapter head 210 along a y-axis. In another example, first surface 222a may be smaller than a length of adapter head 210 along the y-axis.

In some implementations, the gap between arm 222 and first surface 212 is of sufficient width to allow first cable 230 or second cable 280 to be secured in the gap. For example, the gap may have a distance greater than a width of first cable 230 and/or second cable 280. In another example, the gap between arm 222 and first surface 212 may be smaller than the width of first cable 230 and/or second cable 280 such that first cable 230 and/or second cable 280 may be elastically deformable to be compressed into the gap. Although second surface 222b of arm 222 is shown in FIG. 8 as having a straight edge, the examples are not limited thereto, and the edge of second surface 222b of arm 222 may be rounded or angled.

Figure 7:
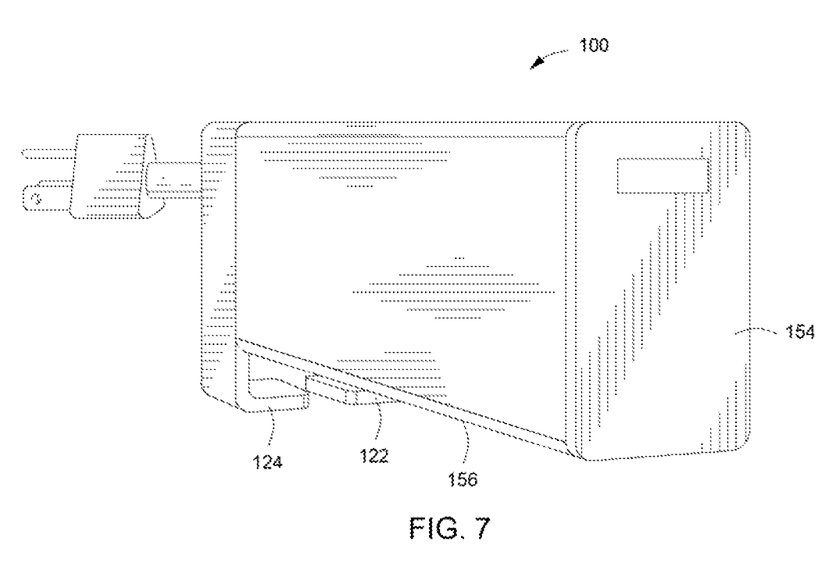
FIG. 7 is a schematic partial rear perspective view of the alternating current adapter of FIG. 1 according to an example.

FIG. 7 illustrates a schematic partial rear perspective view of AC adapter 100 of FIG. 1. In FIG. 7, AC adapter 100 is disposed on first arm 122 and second arm 124 and a third surface 156 (not visible) of housing body 150. In an example, first arm 122 and second arm 124 may secure AC adapter 100 at an angle with respect to a supporting surface on which AC adapter 100 is disposed. In such as an example, heat dissipated by AC adapter 100 may be air cooled along third surface 156 of housing body 150. In such an example, AC adapter 100 may more efficiently dissipate heat when disposed on first arm 122 and second arm 124 than when disposed on another surface of AC adapter 100. Similarly, AC adapter 200 of FIG. 6 may more efficiently dissipate heat when disposed on arm 222 than when disposed on another surface of AC adapter 200.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be understood that the systems, apparatuses, and methods described herein can include various combinations and/or sub-combinations of the components and/or features of the different implementations described. Thus, features described with reference to one or more implementations can be combined with other implementations described herein.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:
1. A computing system comprising:
an alternating current (AC) adapter including a cable extending therefrom coupled to a computing device, the AC adapter including:
an AC adapter housing body;

an AC adapter head disposed on a first end of the AC adapter housing body and to couple the AC adapter housing body to the computing device via the cable;

a first arm extending from a first side of a first surface of the AC adapter head towards a centerline of the first surface of the AC adapter head, wherein the first surface of the AC adapter head is different than a second surface of the AC adapter head that the cable extends from; and a second arm extending from a second side of the first surface of the AC adapter head toward the centerline of the first surface of the AC adapter head, wherein the first arm and the second arm are elastically deformable to be biased towards a first position to engage the cable between the first arm or the second arm and the first surface of the AC adapter head and flexed to a second position to allow an operator to insert the cable between the first arm or the second arm and the first surface of the AC adapter head, and wherein the first arm and the second arm support the AC adapter to lie at an angle with respect to a supporting surface when disposed on the first arm and the second arm and a first surface of the AC adapter housing body coupled to the first surface of the AC adapter head.

2. The computing system of claim 1, wherein the AC adapter head is coupled to the AC adapter housing body via a plug extending from a second surface of the AC adapter head perpendicular to the first surface of the AC adapter head.

3. The computing system of claim 1, wherein a gap between the first surface of the AC adapter head and each of the first arm and the second arm is greater than a width of the cable to allow the first arm and the second arm to compress the cable when the cable is disposed between the first surface of the AC adapter head and each of the first arm and the second arm.

4. The computing system of claim 1, wherein a width of the first arm and a width of the second arm are approximately the same as a width of the first surface of the AC adapter head in a direction parallel to the centerline of the first surface of the AC adapter head.

5. An alternating current (AC) adapter, comprising:
an adapter head including a first arm extending from a first side of a first surface of the adapter head towards a centerline of the first surface of the adapter head to secure a cable extending from a second surface of the adapter head to the first surface of the adapter head, wherein the first surface of the adapter head is different than the second surface of the adapter head that the cable extends from; and
a housing body coupled to the adapter head,
wherein the first arm is elastically deformable to be biased towards a first position to secure the cable between the first arm and the first surface of the adapter head and flexed to a second position to allow an operator to insert the cable between the first arm and the first surface of the adapter head.

6. The AC adapter of claim 5, wherein the cable extends from a second surface of the adapter head perpendicular to the first surface of the adapter head.

7. The AC adapter of claim 5, wherein the adapter head is coupled to the housing body via a plug extending from a second surface of the adapter head perpendicular to the first surface of the AC adapter head.

8. The AC adapter of claim 5, further comprising:
a second arm extending from a second side of the first surface of the adapter head opposite the first side towards the centerline of the first surface of the adapter head to secure the cable to the first surface of the adapter head,
wherein the second arm is elastically deformable to be biased towards a first position to secure the cable between the second arm and the first surface of the adapter head and flexed to a second position to allow an operator to insert the cable between the second arm and the first surface of the adapter head.

9. The AC adapter of claim 8, wherein the first arm and the second arm are made of at least one of: a polyester-based thermoplastic polyurethane (TPU), polyether-based TPU, a thermoplastic elastomers rubber, or a polycarbonate/acrylonitrile butadiene styrene.

10. The AC adapter of claim 8, wherein the first arm and the second arm support the housing body to lie at an angle with respect to a supporting surface when disposed on the first arm and the second arm of the adapter head and a first surface of the housing body coupled to the adapter head.

11. The AC adapter of claim 8, wherein a gap between the first surface of the adapter head and each of the first arm and the second arm is greater than a width of the cable to allow the first arm and the second arm to compress the cable when the cable is disposed between the first surface of the adapter head and each of the first arm and the second arm.

12. The AC adapter of claim 8, wherein an opening between the first arm and second arm, in a direction parallel to the direction the first arm and the second arm, extends less than a width of the cable.

13. The AC adapter of claim 8, wherein the first arm and the second arm are aligned in the direction in which the first arm and the second arm extend.

14. The AC adapter of claim 13, wherein a width of the first arm and a width of the second arm are approximately the same as a width of the first surface of the adapter head in a direction parallel to the centerline of the first surface of the adapter head.

15. An alternating current (AC) adapter, comprising:
a housing body;
an adapter head coupled to a first surface of the housing body via a three-prong plug extending from a first surface of the adapter head with a first cable extending from a second surface of the adapter head opposite the first surface;
a first arm extending from a first side of a third surface of the adapter head towards a centerline of the third surface, wherein the third surface of the adapter head is different from and perpendicular to the first surface and the second surface of the adapter head;
a second arm extending from a second side of the third surface of the adapter head opposite the first side of the third surface of the adapter head towards the centerline of the third surface of the adapter head; and
a second cable coupled to a second surface of the housing body opposite the first surface of the housing body,
wherein the first arm and the second arm are elastically deformable to be biased towards a first position to engage the first cable and/or the second cable between the first arm or the second arm and the third surface of the adapter head and flexed to a second position to allow an operator to insert the first cable and/or the second cable between the first arm or the second arm and the third surface of the adapter head, and wherein the first arm and the second arm support the AC adapter to lie at an angle with respect to a supporting surface when disposed on the first arm and the second arm and a first surface of the housing body coupled to the third surface of the adapter head.

* * * * *